(12) United States Patent
Chi et al.

(10) Patent No.: US 6,209,086 B1
(45) Date of Patent: Mar. 27, 2001

(54) METHOD AND APPARATUS FOR FAST RESPONSE TIME INTERRUPT CONTROL IN A PIPELINED DATA PROCESSOR

(75) Inventors: Shyh An Chi, Tainan; Shisheng Shang, Kaohsiung, both of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/189,830

(22) Filed: Nov. 10, 1998

(30) Foreign Application Priority Data

Aug. 18, 1998 (TW) .................................................. 87113531

(51) Int. Cl.[7] .............................. G06F 9/38; G06F 9/40; G06F 15/78
(52) U.S. Cl. ......................... 712/244; 712/238; 712/244; 714/35
(58) Field of Search ............................. 712/238, 42, 244, 712/227; 714/49, 35

(56) References Cited

U.S. PATENT DOCUMENTS

| | | | |
|---|---|---|---|
| 4,326,247 | * 4/1982 | Chamberlin | 712/42 |
| 4,670,835 | * 6/1987 | Kelly et al. | 714/49 |
| 4,926,323 | * 5/1990 | Baror et al. | 712/238 |

* cited by examiner

Primary Examiner—Daniel H. Pan
Assistant Examiner—Te Susan Chen
(74) Attorney, Agent, or Firm—Proskauer Rose LLP

(57) ABSTRACT

In a fast response time pipelined data processor, an interrupt control device stores the interrupt service routine address or the target address of a branch instruction, as applicable, in a register. If an interrupt occurs while the pipelined data processor is processing a branch instruction, the branch instruction target address stored in the register is used as the return address, and is stored in a working space, so that the interrupt can be processed immediately. Similarly, if an interrupt occurs while the pipelined data processor is processing a prior interrupt or exception, and the first instruction of the interrupt service routine of the previous interrupt has not yet reached the memory access stage, the interrupt service routine as address of the previous interrupt stored in the register is used as the return address, and is stored in the working space, so that the next interrupt can be processed immediately.

10 Claims, 5 Drawing Sheets

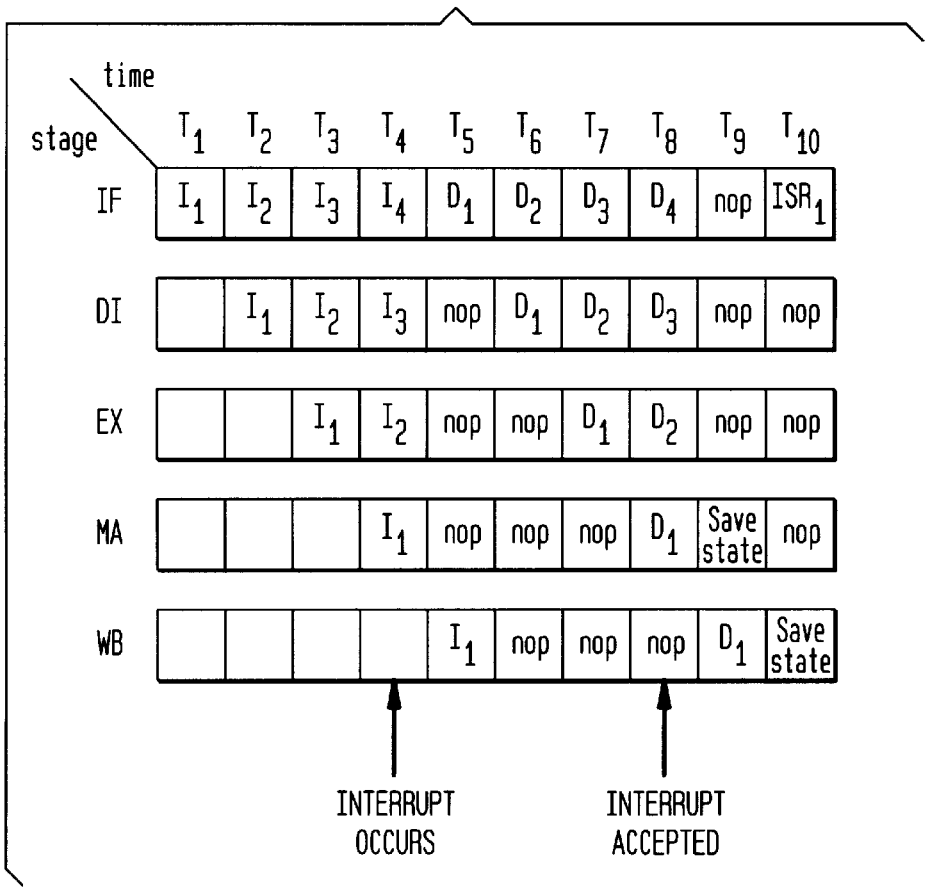

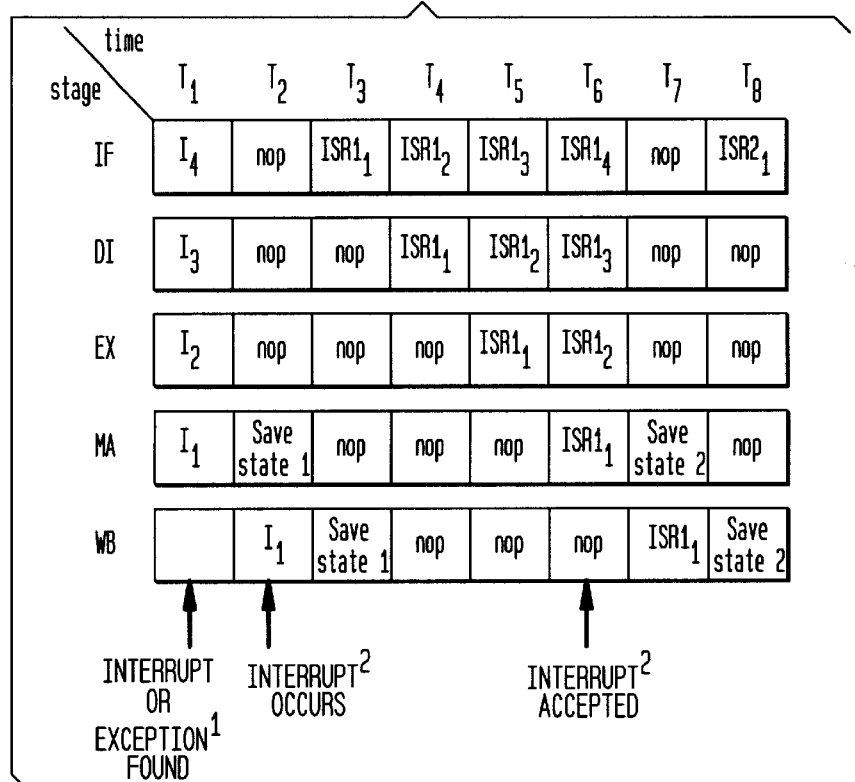
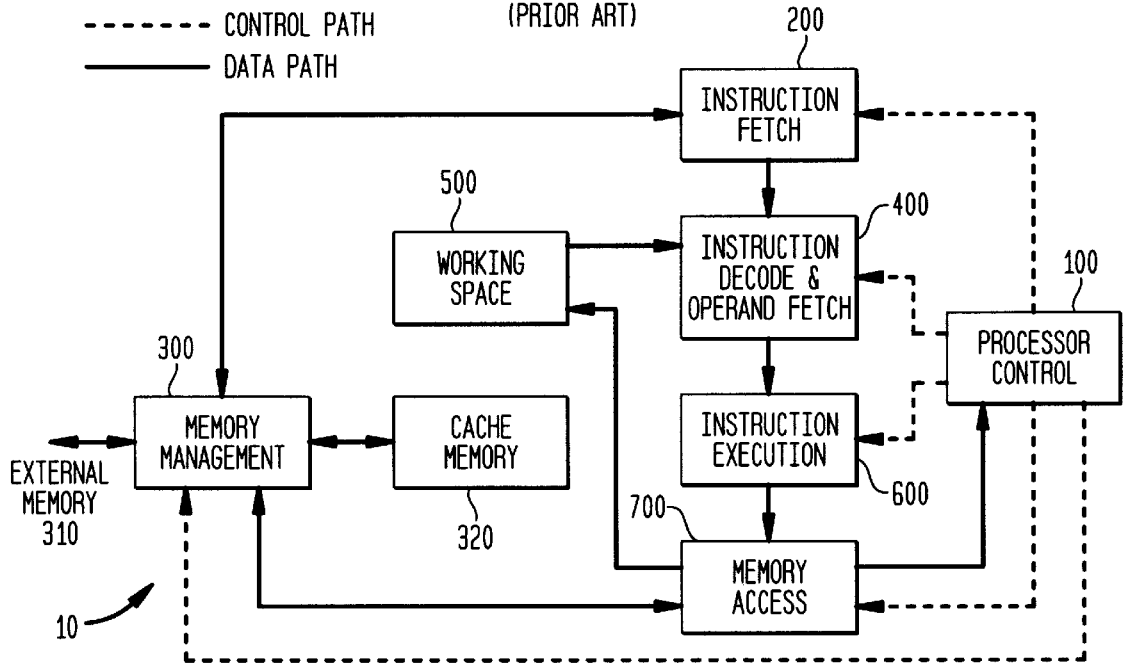

METHOD AND APPARATUS FOR FAST RESPONSE TIME INTERRUPT CONTROL IN A PIPELINED DATA PROCESSOR

FIELD OF THE INVENTION

The present invention relates to an interrupt control method and apparatus. More specifically, the present invention relates to an interrupt control method and apparatus for reducing the interrupt response time in a pipelined data processor.

BACKGROUND OF THE INVENTION

An interrupt is an important channel of communication between a data processor and its associated external devices. In many data processing systems, the data input and output is achieved through interrupts. In a real time and embedded system, there is a critical need for very fast response times to incoming interrupts. In industrial applications such as aviation, automation control, and biomedical monitoring systems, the central processing unit (CPU) must have a very fast response time control mechanism, in order to process any type of emergency interrupt in a timely fashion, so as to avoid tragic consequences.

For example, in the general prior art, the pipelined data processor can be divided into five stages:

1) instruction fetch (IF),
2) instruction decode and operand fetch (DI),
3) instruction execution (EX),
4) memory access (MA)
5) write back (WB).

The pipelined data processor usually has to meet the requirement of "precise interrupt" in processing interrupt requests. That is, when there is an interrupt, the save state and the state of normal execution of the processor must be the same. To meet this requirement, a prior art processor will process an interrupt only at the boundary of an instruction, so that the instruction is either completely executed, or not executed at all. To simplify this type of processor design, those exceptions which are generated by memory access (stage 4) are not processed, so that the time for processing interrupt requests is after the execution stage (stage 3), and before the write back stage (stage 5). Nevertheless, it is also possible to process interrupt requests at different stages, depending on the designer's choice and the processor type.

The pipeline stages of a typical prior art processor are discussed herein to show the disadvantages of this kind of interrupt processing design. The instruction fetch (stage 1) is assumed to require one clock cycle. Also, the method of processing interrupts is assumed to be similar to that of the trap type exception, which requires that the trap instruction be retired before the processor state is stored. Or, if the method of processing interrupts is assumed to be similar to that of the fault type exception, where the fault instruction is discarded before the processor state is stored, there will be further disadvantages, as discussed below.

FIG. 1 shows a program fragment sample, and FIG. 2 depicts the timing relationship of the program fragment sample during a pipelined execution. If $I_1$ in FIGS. 1 and 2 is assumed to be a branch instruction, the processor will know whether or not a branch is taken, immediately after the stage of instruction execution ($T_4$). If a branch is taken, the processor will clear the pipeline after the instruction execution stage, and start to execute the branch instruction with the branch target address ($T_5$) However, if an interrupt occurs between $T_4$ and $T_7$, the processor must wait until $T_8$ to process the interrupt, since that is the time when the target address instruction ($D_1$) of the branch instruction ($I_1$) reaches the memory access (MA) stage.

In addition to this undesirable delay, there is yet another disadvantage to the design selection stated above. This is illustrated in FIG. 3, which shows an example of delayed response and processing time, as caused by a second interrupt that occurs after the first interrupt or exception. As shown in FIG. 3, $ISR1_i$ represents the $i^{th}$ instruction of the interrupt service routine for the first interrupt (or exception), while ISR2i represents the $i^{th}$ instruction of the interrupt service routine for the second interrupt. If an interrupt or exception occurs at instruction $I_1$ during the time $T_1$, the processor will save the processor state 1 (such as program counter, register, and memory content) in the memory access (MA) stage, at $T_2$ in FIG. 3. At the same time, the processor will fetch the starting address of the interrupt service routine ($ISR1_1$) from an external memory unit, and send it to Instruction Fetch, to be executed anew by the interrupt service routine, at $T_3$. If a second interrupt occurs between $T_2$ and $T_5$, the processor must wait until the $ISR_1$, reaches the memory access (MA) stage at $T_6$ before it can process the interrupt.

Thus, if an interrupt occurs when an instruction in the MA stage is a branch instruction, or when an interrupt occurs at the time the processor is processing another interrupt or exception, no interrupt will be accepted until the branch address instruction or the first instruction of the interrupt service routine reaches the memory access stage. If the processor does not have a cache, or there is a cache miss, the time will be prolonged for fetching either the branch target address instruction or the first instruction of the interrupt service routine. Thus, the time that the processor takes to process an interrupt would be increased. As such, the processor could not satisfy a requirement for real time control.

It is therefore an object of the present invention to improve the interrupt response time performance of a pipelined data processor by overcoming the disadvantages of the prior art.

SUMMARY OF THE INVENTION

In accordance with an illustrative embodiment of the present invention, a method and apparatus is disclosed for controlling interrupts and exceptions in a fast response time pipelined data processor. The method is as follows:

If a pipeline processing instruction cycle begins with a branch instruction, and the branch instruction has reached an instruction boundary (i.e., a memory access stage), and a branch is taken, or if an instruction located at a target address of a branch instruction has not yet reached an instuction boundary, storing the target address of the branch instuction at a first part of a working space, otherwise, storing a first return address of a first interrupt or exception at the first part of the working space,
  b) fetching a service routine starting address of the first interrupt/exception and executing a first instruction of the service routine at the starting address,
  c) completing the execution of the first interrupt/exception service routine, and
  d) returning to either the target address of the branch instruction or the first interrupt/exception starting address, whichever address having been previously stored in the first part of the working space.

Thus, the inventive process described above enables a fast response pipelined processor to process an interrupt/ exception within a pipeline stage at the time the first interrupt/exception occurs.

Moreover, the inventive method and apparatus can be adapted for processing nested interrupts as well, in accordance with the following steps:

a) storing the fetched first interrupt/exception service routine starting address in temporary storage in the pipelined processor, b) if a second interrupt/exception occurs with a higher priority than the first interrupt/exception, and the first instruction of the first interrupt/exception service routine has not reached the instruction boundary, fetching the first instruction of the first interrupt/exception service routine from temporary storage and storing it in a second part of the working space, or c) when the first instruction of the first interrupt/exception service routine has reached the instruction boundary, storing the return address of the second interrupt/exception service routine at the second part of the working space, d) fetching a starting address of the second interrupt/exception service routine and executing the second interrupt/exception service routine, and e) returning to either the first interrupt/exception starting address or the second interrupt/exception starting address, whichever address having been previously stored in the second part of the working space, after completing execution of the second interrupt/exception service routine.

The inventive method is implemented by means of an interrupt control device, which is made up of a storage register and a multiplexer within the processor control unit. The control unit provides a select signal to the multiplexer, which selects the designated input as the return address to be sent to the working space during the write back stage. The inputs are either a fault type exception, a trap type exception or interrupt, or the output of the storage register. The control unit stores the branch target address, or the interrupt service routine starting address, as applicable, into the storage register, for inputting to the multiplexer. As a result, the processor can process interrupts immediately, since the appropriate return address has been stored in the working space.

An illustrative embodiment of the present invention is more fully described below in conjunction with the following drawings.

BRIEF DESCRIPTION OF THE DRAWINGS

FIG. 1 shows a processor program fragment sample.

FIG. 2 illustrates the prior art sequential relationship of the program fragment sample of FIG. 1.

FIG. 3 shows a prior art example of the delayed response and processing time caused by a second interrupt occurring after a first interrupt or exception.

FIG. 4 is a block diagram of a typical prior art pipelined processor.

DETAILED DESCRIPTION OF THE INVENTION

Figure 5:
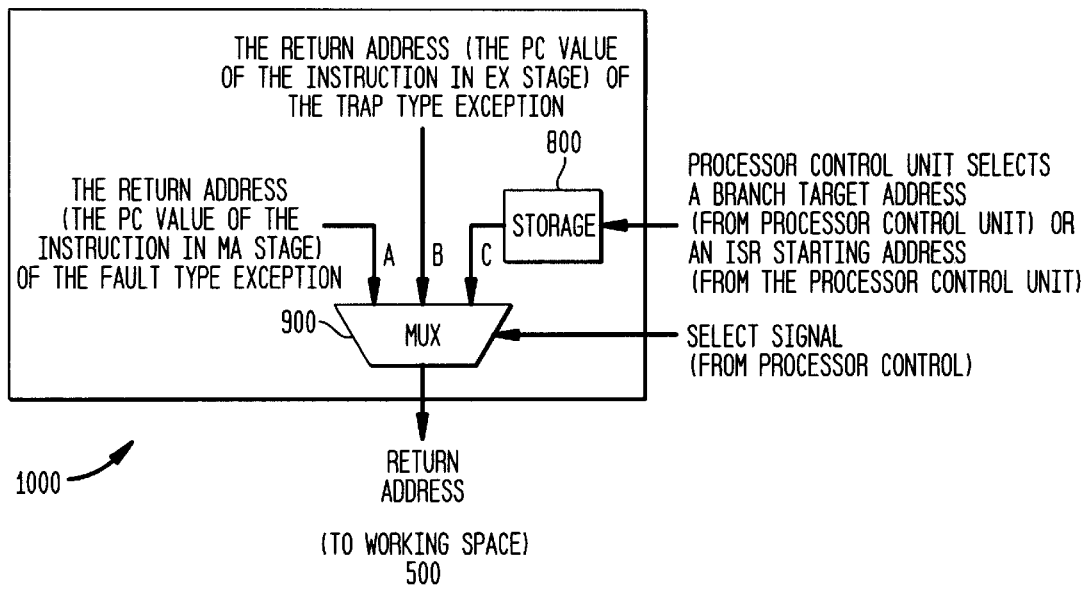
FIG. 5 depicts an interrupt control device in accordance with the present invention.

In accordance with an embodiment of the present invention, a storage device is used to store either the target address of a branch instruction (the branch target address), or the address of the first instruction of an interrupt service routine, as applicable. The storage device can be, e.g., a buffer, or a register for temporary storage. Then, when an interrupt occurs at the time the instruction is a branch instruction in the MA stage, or when an interrupt occurs at the time the processor is processing another interrupt or exception, the storage device can provide a return address before the branch instruction or the first instruction of the interrupt service routine reaches the boundary of an instruction. As a result, the processor can simply store this return address, while also processing the new interrupt situation without having to wait for the first instruction of the interrupt service routine to reach the instruction boundary.

The present invention can be more clearly described in conjunction with a typical pipelined data processor model 10, as illustrated in FIG. 4. As stated previously, an example of five stages in a pipelined data processing model is presented herein for illustration of the inventive process:

1) instruction fetch (IF), 2) instruction decode and operand fetch (DI), 3) instruction execution (EX), 4) memory access (MA)

5) write back (WB).

In this model, it is assumed that the instruction fetch requires one clock cycle, and that the processing method of the interrupt is similar to that of the trap type exception. That is, the trap instruction has to be retired before the processor state is stored. In addition, the present invention is also applicable when the processing method of the interrupt is similar to that of the fault type exception, where the fault instruction is discarded before the processor state is stored.

As shown in FIG. 4, the processor control unit (PCU) 100 is responsible for controlling the overall pipelining operation and the flow of interrupt processing. The instruction fetch (IF) stage 200 is responsible for fetching instructions. The instructions can be fetched from an external memory unit 310, or from a built-in cache memory 320, as coordinated by the memory management unit 300. The instructions fetched during the IF stage are transmitted individually to the instruction decode and operand fetch stage 400, in sequential order, or in a batch. The instructions are then decoded, and an operand is fetched from the working space 500. The working space 500 is a location where the computation results can be temporarily stored. At the write back (WB) stage, processor 10 will store results to the working space 500. After the DI stage, the instructions are sent to the instruction execution (EX) stage 600. The instructions are then executed, and transmitted to the memory access (MA) stage 700, where memory access will be performed. Memory access can be initiated by external memory unit 310, or by built-in cache memory 320.

Illustratively, in order to achieve very fast interrupt processing, an inventive interrupt control device 1000 is used in the MA stage (the instruction boundary in the MA stage), as shown in FIG. 5. The interrupt control device 1000 comprises a storage register 800 and a multiplexer (MUX) 900. Storage register 800 is used to store the interrupt service routine starting address, or the branch target address, as applicable. Register 800 is one (C) of three input sources for MUX 900. The other two input sources are:
(A) the return address of the fault type exception (namely, the program counter (PC) value of the instruction in the MA stage in this example), and
(B) the return address of the trap type exception (namely, the PC value of the instruction in the EX stage in this example).

When there is an interrupt or an exception, MUX 900 selects one of the three sources (A,B,C) as the return address, and stores it in working space 500 during the write back (WB) stage. PCU 100 (FIG. 4) provides an appropriate select signal for MUX 900, along with the corresponding interrupt service routine starting address or branch target address for storage register 800. If there are multiple interrupts or exceptions occurring at the same time, PCU 100 selects the interrupt or exception with the highest priority.

When the instruction has an exception, PCU 100 will send select signals for MUX 900 in accordance with the exception type (fault or trap). Either the return address of the fault type exception (A in FIG. 5), or the return address of the trap type exception (B in FIG. 5), will be stored in working space 500 during the write back (WB) stage. When an interrupt occurs, and PCU 100 detects that it is at the instruction boundary (i.e., a valid instruction in the MA stage), PCU 100 will allow the instruction in the memory access (MA) stage to be retired. PCU 100 will then send a select signal to MUX 900, which causes MUX 900 to select the return address of the trap type exception (B in FIG. 5) to be stored in working space 500 at the WB stage. Thus, when the interrupt service routine (ISR) of an interrupt or an exception is completed, a correct return address will be obtained.

In the event that an interrupt occurs when a branch instruction is at the MA stage, or if the branch target address instruction has not yet reached the boundary of the instruction (i.e., has not reached the MA stage), PCU 100 will select the branch instruction target address C in FIG. 5) from storage register 800 as the return address, and will store it in working space 500, so that the interrupt can be processed immediately. This timing relationship process is illustrated in FIG. 6, based on the program fragment sample of FIG. 1 during a pipelined execution.

Figure 6:
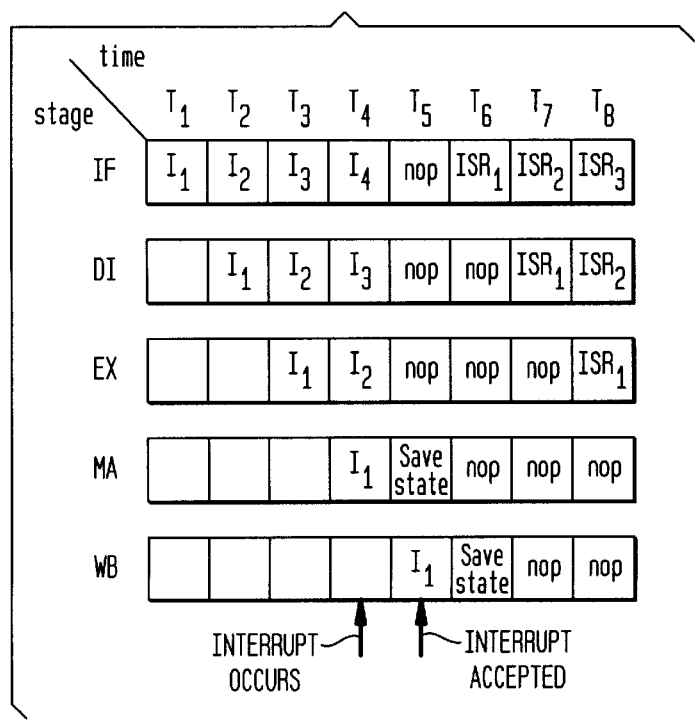
FIG. 6 shows an example of an interrupt situation when using the inventive interrupt control device to process branch instructions.

If $I_i$ in FIG. 6 is a branch instruction, PCU 100 will know after the EX stage (at $T_4$) whether or not the sequence of instruction execution is changed (if a branch is taken or not taken). If there is a change, PCU 100 will store the branch instruction target address in storage register 800 (FIG. 5) at $T_4$ (FIG. 6). If an interrupt occurs at $T_4$, PCU 100 will send a select signal to MUX 900 at $T_5$, to select the address stored in register 800 C in FIG. 5) as the return address, and will store the return address (C) in working space 500 at the WB stage. At the same time ($T_5$), PCU loo will fetch the starting address of the interrupt service routine ($ISR_1$) through memory management unit 300, and will send it to the IF stage to be executed, at $T_6$. Therefore, the interrupt that occurs at $T_4$ can be processed at $T_5$, instead of at $T_8$, as shown in the prior art example of FIG. 2, thus eliminating undesirable processing delays.

For the case of nested interrupts, that is, when a second interrupt occurs while the processor is processing a previous interrupt or exception, and when the first ISR instruction of the previous interrupt or exception has not yet reached the boundary of the instruction (the MA stage), PCU 100 will select the interrupt service routine address C in FIG. 5) of the previous interrupt or exception stored in register 800. This return address is then stored in working space 500, so that the next interrupt can be processed immediately. This sequential relationship is illustrated in FIG. 7, again based on the program fragment sample of FIG. 1.

Figure 7:
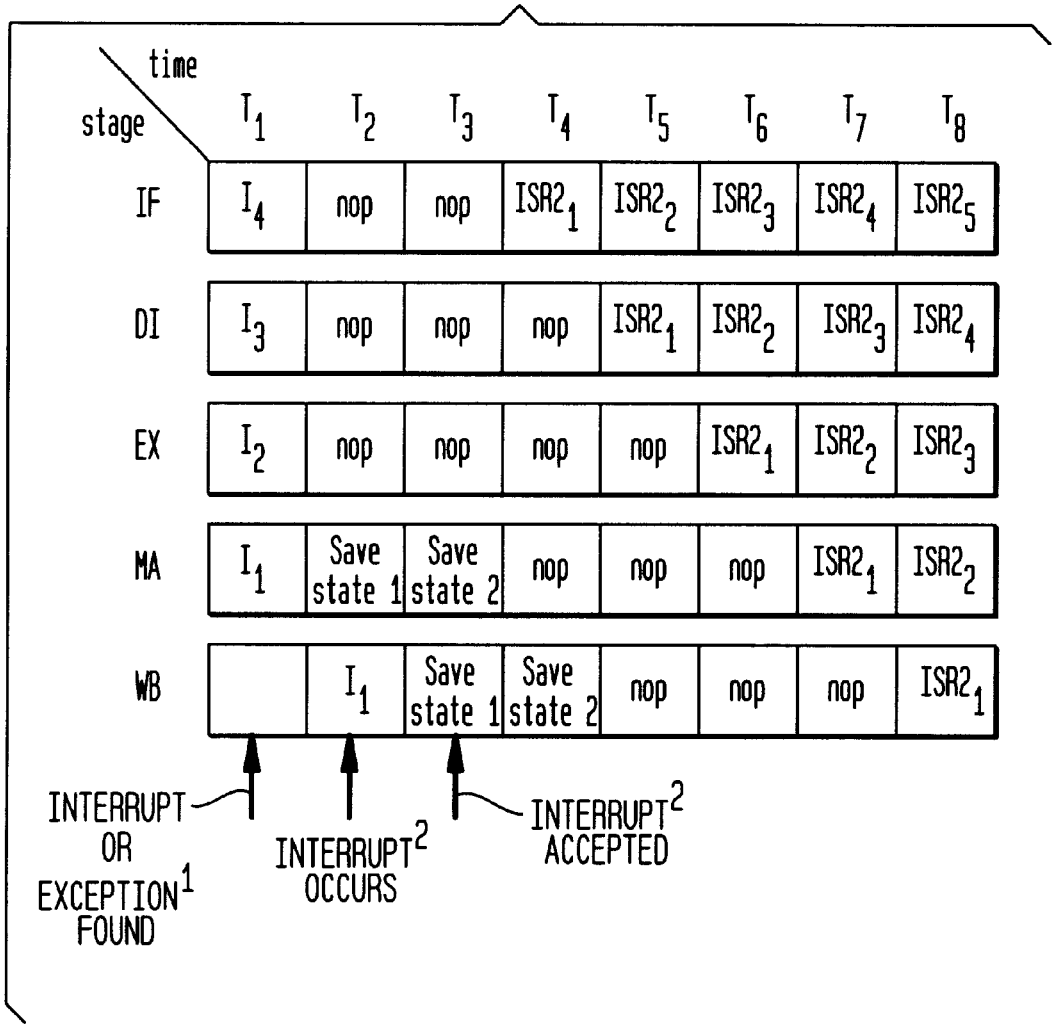
FIG. 7 shows an example of a second interrupt occurring after a first interrupt or exception during the instruction execution, in accordance with the inventive interrupt control device.

As shown in FIG. 7, $ISR2_i$ represents the $i^{th}$ instruction of the interrupt service routine of the second interrupt. While $ISR1_i$ would represent the $i^{th}$ instruction of the interrupt service routine of the first interrupt or exception, $ISR1_1$ is not shown in FIG. 7 because it is executed after the completion of $ISR2_i$. That is, since the program size of $ISR2_i$ is dependent on the type of interrupt or exception, it is not known when $ISR2_i$ will complete its execution, after which $ISR1_i$ can be executed.

When an interrupt or exception occurs at $T_1$, PCU 100 will store the processor state 1 (such as program counter, register and memory content) in memory access (MA) stage 700, at $T_2$. At the same time, PCU 100 will fetch the starting address of the interrupt service routine 1 ($ISR1_1$) from external memory unit 310, and will send it to the IF stage to be executed at $T_3$. Simultaneously, at $T_3$, PCU 100 stores the starting address of $ISR1_1$, in register 800. If a second (nested) interrupt occurs at $T_2$, PCU 100 will send a select signal at $T_3$ to MUX 900. This select signal will cause MUX 900 to select the address C (FIG. 5) in register 800 as the return address, and to store it in working space 500 in the WB stage ($T_4$ in FIG. 7). At the same time ($T_3$), PCU 100 goes to memory unit 300 to fetch the starting address of the interrupt service routine 2 ($ISR2_1$), and sends it to the IF stage to be executed at $T_4$. Therefore, in the case of nested interrupts, the second interrupt that occurs at $T_2$ can be processed immediately at $T_3$, instead of at $T_6$, as shown in the prior art example of FIG. 3.

Thus, it is clear that the response time of a pipelined data processor can be reduced by means of the inventive interrupt control device and method. A flow chart of the inventive method is illustrated in FIG. 8, which refers to the inventive interrupt control device 1000 of FIG. 5, and the pipelined processor 10 of FIG. 4.

Figure 8:
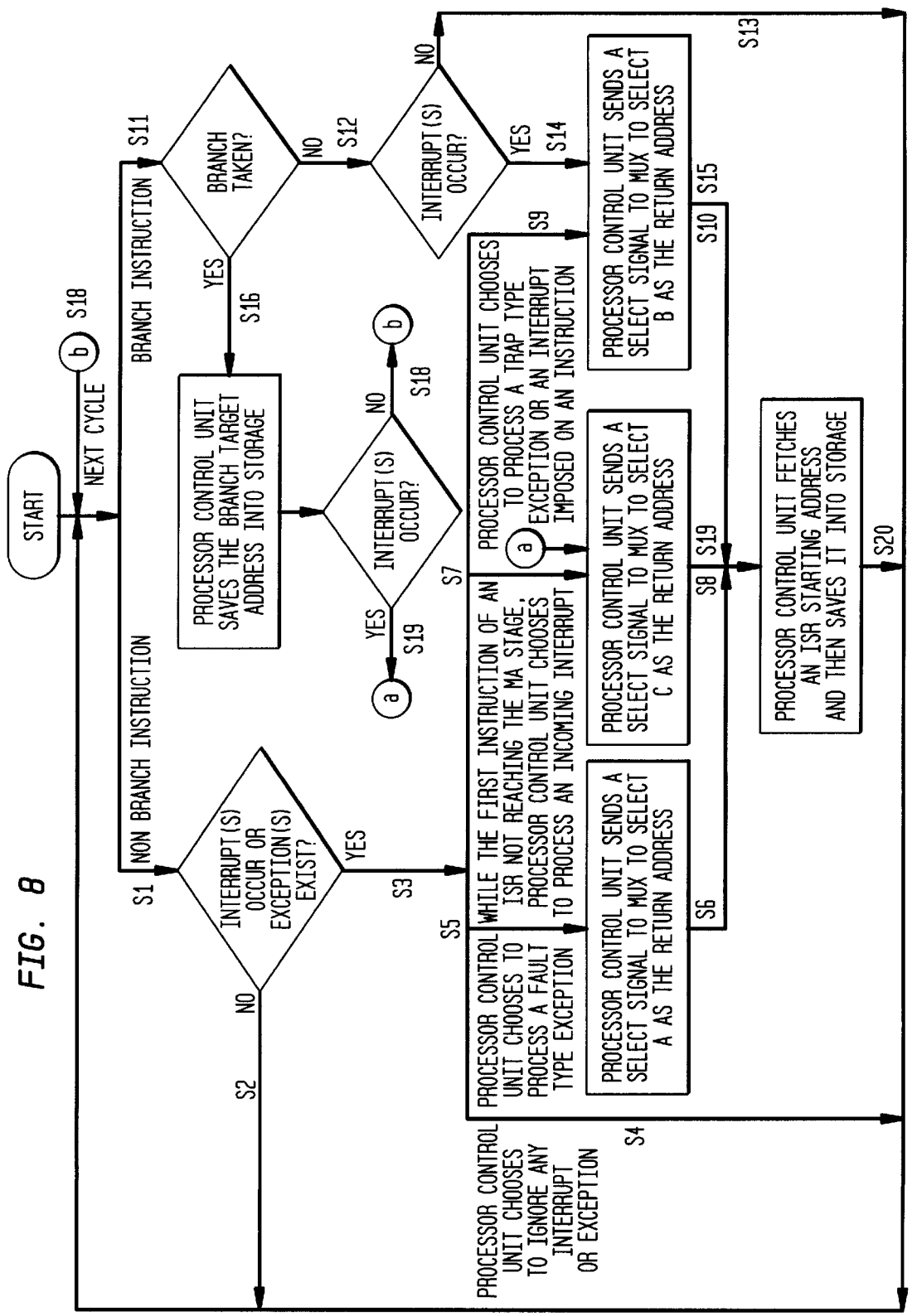
FIG. 8 is a flow diagram of the inventive interrupt control method.

At the Start stage of FIG. 8, the processor control unit (PCU 100) first determines whether there is a non-branch instruction or a branch instruction in the instruction boundary. If it is a non-branch instruction (step S1), and there are no interrupts or exceptions, the instruction proceeds normally (step S2). If there is an interrupt or exception (step S3), PCU 100 can either ignore them (step S4), or can determine the type of interrupt or exception and the boundary status, and will then output the appropriate select signal to MUX 900. For example, for a fault type exception (step S5), PCU 100 causes MUX 900 to select the return address of fault type exception (A) as the return address to be stored in working space 500 during the write back stage (step S6), and for a trap type exception (step S9), PCU 100 causes MUX 900 to select the return address of trap type exception (B) as the return address to be stored (step S10). PCU 100 can also choose to process an incoming interrupt before the first instruction of the interrupt service routine (ISR) reaches the MA stage (step S7). In this case, PCU 100 will cause MUX 900 to select the ISR starting address in register 800 (C) as the return address to be stored (step S8).

Referring back to the Start stage, if the instruction is a branch instruction (step S11), PCU 100 determines whether or not the branch is taken. If the branch is not taken (step S12), and no interrupts occur (step S13), the instruction proceeds normally. If an interrupt does occur (step S14), PCU 100 causes MUX 900 to select the return address of the interrupt (B) as the return address to be stored (step S15). On the other hand, if the branch instruction has been taken (step S16), PCU 100 saves the branch target address into storage register 800. If no interrupt occurs (step S18), the next cycle proceeds normally (point b). If an interrupt does occur (step S19), PCU 100 causes MUX 900 to select the branch target address (C), at point (a), as the return address to be stored.

Finally, after MUX 900 selects either A, B, or C as the return address to be stored, PCU 100 fetches an ISR starting address, and stores it into storage register 800 (step S20).

In short, a method and apparatus is disclosed for a fast response interrupt control mechanism in a pipelined data processor system.

Moreover, the disclosed interrupt control mechanism can be used in a real time system, which requires fast response times to interrupts and exceptions, in order to reduce the interaction times with external devices.

The above described embodiments of the invention are intended to be illustrative only. Numerous alternative embodiments may be devised by those skilled in the art without departing from the spirit and scope of the following claims.

What is claimed is:

1. A method for controlling interrupts and exceptions in a fast response time pipelined processor, comprising the following steps;
    a) if a pipeline processing instruction cycle begins with a branch instruction, and said branch instruction has reached an instruction boundary, said instruction boundary being a memory access stage, and a branch is taken, or if an instruction located at a target address of a branch instruction has not yet reached an instruction boundary, storing said target address of said branch instruction at a first part of a working space,
    otherwise, storing a first return address of a first interrupt or exception at said first part of said working space,
    b) fetching a service routine starting address of said first interrupt/exception and executing a first instruction of said service routine at said starting address,
    c) completing the execution of said first interrupt/exception service routine, and
    d) returning to either said target address of said branch instruction or said first interrupt/exception starting address, whichever address having been previously stored at said first part of said working space,
    wherein said fast response time pipelined processor processes said interrupts and exceptions within a pipeline stage at the time said interrupts and exceptions occur.

2. The method of claim 1 wherein step b) further comprises:
    storing said fetched first interrupt/exception service routine starting address in temporary storage in said pipelined processor, and
    if a second interrupt/exception occurs with a higher priority than said first interrupt/exception,
    wherein when said first instruction of said first interrupt/exception service routine has not reached the instruction boundary, fetching said starting address of said first interrupt/exception service routine from said temporary storage and storing it in a second part of said working space,
    wherein when said first instruction of said first interrupt/exception service routine has reached the instruction boundary, storing a second return address of a service routine of said second interrupt/exception at said second part of said working space,
    fetching a starting address of said second interrupt/exception service routine and executing said second interrupt/exception service routine, and returning to either said first interrupt/exception service routine starting address or said second interrupt/exception service routine starting address whichever having been previously stored in said second part of said working space, after completing execution of said second interrupt/exception service routine.

3. The method of claim 1 wherein said first interrupt/exception is an interrupt or trap type exception, and said first return address of said first interrupt/exception service routine is a program counter value of a prior pipeline stage immediately preceding said pipeline stage currently processing said first interrupt/exception.

4. The method of claim 1 wherein said first interrupt/exception is an interrupt or fault type exception, and said first return address of said first interrupt/exception service routine is a program counter value of said pipeline stage currently processing said first interrupt/exception.

5. The method of claim 2 wherein said second interrupt/exception is an interrupt or trap type exception, and said second return address of said second interrupt/exception service routine is a program counter value of a prior pipeline stage immediately preceding said pipeline stage currently processing said second interrupt/exception.

6. The method of claim 2 wherein said second interrupt/exception is an interrupt or fault type exception, and said second return address of said second interrupt/exception service routine is a program counter value of said pipeline stage currently processing said second interrupt/exception.

7. A processor control apparatus for controlling interrupts and exceptions which are processed in a first pipeline stage of a fast response time pipelined processor, comprising:
    a) a processor control unit, having a first output port and a second output port,
    b) a storage device having an input and an output,
    c) a multiplexer having a select input, a plurality of return address inputs, and an output,
    wherein when said processor control unit receives a branch taken signal of a branch instruction at a first clock, said processor control unit outputs a branch target address of said branch instruction from said first output port to said storage device input,
    wherein when said processor control unit receives an interrupt/exception at said first clock, said processor control unit outputs a select signal at a second clock front said second output port to said select input of said multiplexer, said select signal designating a particular one of said plurality of return address inputs as a return address of said interrupt/exception, said processor control unit also fetching a starting address of a service routine of said interrupt/exception at said second clock, said processor control unit then outputting said starting address from said first output port to said storage device input, and
    wherein said multiplexer, in accordance with said select signal designation, selects at one of said plurality of return address inputs either:
        said branch target address or said interrupt/exception start address from said output of said storage device, or
        a program counter value of said first pipeline stage, when an interrupt/exception occurs in the absence of a branch taken signal and said pipeline processor processes said interrupt/exception as a trap type exception, or
        a program counter value of a second pipeline stage, when an interrupt/exception occurs in the absence of a branch taken signal and said pipeline processor processes said interrupt/exception as a fault type exception, said multiplexer then outputting said selected return address of said interrupt/exception service routine.

8. The processor control apparatus of claim 7 further comprising:

a return address storage device having an input and an output, said return address storage device input being connected to said multiplexer output, wherein said return address storage device input receives said selected return address outputted from said multiplexer for temporary storage.

9. The processor control apparatus of claim 8 further comprising a working space for receiving said selected return address from said return address storage device output for temporary storage.

10. The processor control apparatus of claim 7 wherein when said processor control unit does not receive said branch taken signal and said interrupt/exception occurs, and if a first instruction of a prior interrupt/exception has not reached an instruction boundary, said select signal output from said processor control unit causes said multiplexer to select an output from said storage device, and said return address of said interrupt/exception service routine is a starting address of a service routine of said prior interrupt/exception.

* * * * *